(12) United States Patent
Rajapakse et al.

(10) Patent No.: US 9,679,262 B2
(45) Date of Patent: Jun. 13, 2017

(54) IMAGE INDEX ROUTING

(71) Applicant: Bank of America Corporation, Charlotte, NC (US)

(72) Inventors: Navin Rajapakse, Hoboken, NJ (US); Silvia Adriana Krasuk, Los Angeles, CA (US); Raja Dharuman, Simi Valley, CA (US); Girish Venkobarao Nagasamudra, Aurora, IL (US); Srikar Nuvvula, Dallas, TX (US)

(73) Assignee: Bank of America Corporation, Charlotte, NC (US)

( * ) Notice: Subject to any disclaimer, the term of this patent is extended or adjusted under 35 U.S.C. 154(b) by 817 days.

(21) Appl. No.: 14/076,442

(22) Filed: Nov. 11, 2013

(65) Prior Publication Data

US 2015/0134562 A1 May 14, 2015

(51) Int. Cl.
G06Q 10/06 (2012.01)
G06Q 10/10 (2012.01)
G06Q 30/02 (2012.01)
G06Q 10/00 (2012.01)

(52) U.S. Cl.
CPC ........... *G06Q 10/00* (2013.01); *G06Q 10/103* (2013.01)

(58) Field of Classification Search
CPC .............................. G06Q 10/103; G06Q 10/00
USPC .................................................. 705/1.1–912
See application file for complete search history.

(56) References Cited

U.S. PATENT DOCUMENTS

| 5,054,096 | A | 10/1991 | Beizer |
| 5,235,433 | A | 8/1993 | Clarkson et al. |
| 5,253,308 | A | 10/1993 | Johnson |
| 5,666,490 | A | 9/1997 | Gillings et al. |
| 6,504,571 | B1 | 1/2003 | Narayanaswami et al. |
| 7,035,467 | B2 | 4/2006 | Nicponski |
| 7,363,290 | B1 | 4/2008 | Daniel, Jr. et al. |
| 8,295,649 | B2 | 10/2012 | Berini et al. |
| 2003/0007703 | A1 | 1/2003 | Roylance |
| 2004/0218781 | A1 | 11/2004 | Kryka et al. |
| 2008/0127183 | A1* | 5/2008 | Emerson ............... G06F 9/5038 718/100 |
| 2008/0218812 | A1 | 9/2008 | Wolf |
| 2008/0285886 | A1 | 11/2008 | Allen |

(Continued)

FOREIGN PATENT DOCUMENTS

WO  WO2004097687  11/2004

*Primary Examiner* — Jonathan Ouellette
(74) *Attorney, Agent, or Firm* — Weiss & Arons LLP; Michael A. Springs, Esq.

(57) ABSTRACT

Apparatus for routing batch data to two or more vendors is provided. The apparatus may include a receiver configured to receive a first message from a queue manager. The first message may include a first message topic. The first message may also include a pre-routing database location. The pre-routing database location may be a location in a database where batch data is stored. The first message may also include batch data characteristics. The batch data characteristics may define characteristics of the stored batch data. The apparatus may also include a transmitter configured to transmit to a rules database the batch data characteristics. The apparatus may further include a receiver configured to receive a routing rule from the rules database. The routing rule may be based at least in part on the batch data characteristics.

20 Claims, 6 Drawing Sheets

(56) References Cited

U.S. PATENT DOCUMENTS

2011/0205576 A1* 8/2011 Halron .............. G06F 17/30011
                                                    358/1.15
2013/0311386 A1* 11/2013 Tehranchi ............ G06Q 30/018
                                                     705/317

* cited by examiner

FIG. 6

INDEX ROUTER — 601

| CHANNEL 603 | DIVISION 605 | SOURCE 607 | DESCRIPTION 609 | VENDOR 1 SPLIT % 611 | VENDOR 2 SPLIT % 613 | TOTAL SPLIT % 615 | EFFECTIVE FROM [VENDOR SPLIT % LAST UPDATE DATE/TIME (CST)] | INDEXING PRIORITY 1 = HIGHEST PRIORITY 617 619 | EFFECTIVE FROM [INDEXING PRIORITY LAST 621 UPDATE DATE/TIME (CST)] | IS ACTIVE 623 |
|---|---|---|---|---|---|---|---|---|---|---|
| FAX | FULFILLMENT | | | | | | | | | |
| | | 866-XXX-XXXX | RETAIL | 20 | 80 | 100 | 2013/05/13 11:25:39 | 2 | 2013/05/13 11:25:39 | ☑ |
| | | 866-XXX-XXXX | NACA | 100 | 0 | 100 | 2013/05/13 11:25:39 | 5 | 2013/05/13 11:25:39 | ☑ |
| +FAX | POSTCLEARING | 866-XXX-XXXX | POST-CLOSING | 60 | 40 | 100 | 2013/05/13 11:25:39 | 2 | 2013/05/13 11:25:39 | ☑ |
| +FAX | SALES | | | 80 | 20 | | | | | ☐ |
| −FILEUPLOAD | DEFAULT SERVICING | | | | | | | | | |
| | | EDOC PORTAL | EDOC PORTAL | 0 | 0 | 100 | 2013/05/13 11:25:39 | 2 | 2013/05/13 11:25:39 | ☑ |
| | | BORROWER PORTAL | BORROWER PORTAL | 50 | 50 | 100 | 2013/05/13 11:25:39 | 2 | 2013/05/13 11:25:39 | ☑ |
| | | IPORTAL | IPORTAL | 40 | 60 | 100 | 2013/05/13 11:25:39 | 2 | 2013/05/13 11:25:39 | ☑ |
| −FILEUPLOAD | SERVICING | | | | | | | | | ☐ |
| +FILEUPLOAD | FULFILLMENT | EDOC PORTAL | EDOC PORTAL | 100 | 0 | 100 | 2013/05/13 11:25:39 | 1 | 2013/05/13 11:25:39 | ☑ |
| +FAX | POSTCLEARING | EDOC PORTAL | TRAILING DOC CLOSING | 0 | 100 | 100 | 2013/05/13 11:25:39 | 3 | 2013/05/13 11:25:39 | ☑ |
| | | | | 50 | 50 | 100 | 2013/05/13 11:25:39 | 3 | 2013/05/13 11:25:39 | ☑ |
| +SCAN | FULFILLMENT | DOC PROVIDER | TRAILING DOC CLOSING | 50 | 50 | 100 | 2013/05/13 11:25:39 | 2 | 2013/05/13 11:25:39 | ☑ |

Submit (Save) 625    Cancel 627

IMAGE INDEX ROUTING

FIELD OF TECHNOLOGY

The invention relates to a tool for use in data routing. Specifically, the invention relates to a tool for data routing based on one or more business rules.

BACKGROUND OF THE DISCLOSURE

Many businesses receive large amounts of data on a daily basis. Some of these businesses need to process at least a portion of their received data. For example, a financial institution typically receives hundreds of thousands of scanned documents daily. The financial institution may need to index and classify a portion of its received data for retrieval and data management purposes.

Typically, a business selects one or two vendors for data processing. However, at a later point in time, the business may desire to use different vendors to process its data. For example, a different vendor may offer a discount on its processing fee, or provide more specialized processing personnel.

It would be desirable, therefore, to provide systems and methods for enabling a business to dynamically route data in real-time to one or more service providers. This would be desirable at least because it maximizes the business's utilization of vendor competitive advantage and provides contingencies in case of service provider failure.

SUMMARY OF THE DISCLOSURE

Systems and methods are provided for routing data to a vendor. A method in accordance with the invention may include using a receiver to receive a first message from a queue manager. The first message may include a first message topic and a pre-routing database location. The pre-routing database location may be a location in a database where batch data is stored. The first message may also include batch data characteristics. The batch data characteristics may define characteristics of the stored batch data. The batch data characteristics may include an identification of a document capture channel that captured the batch data and a line of business associated with the batch data.

The method may also include using a transmitter to transmit to a rules database the batch data characteristics. The method may also include using a receiver to receive a routing rule from the rules database. The routing rule may be based at least in part on the batch data characteristics.

The method may further include using a processor to transfer the batch data from the pre-routing database location to a post-routing database location. The post-routing database location may be accessible to a vendor identified in the routing rule.

Upon completion of the data transfer, the method may also include using a transmitter to transmit a second message to the queue manager. The second message may include a second message topic. The vendor identified in the routing rule may have registered a subscription with the queue manager for the second message topic.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which:

FIG. 6 shows an illustrative graphical display that may be output by apparatus in accordance with the invention.

DETAILED DESCRIPTION OF THE DISCLOSURE

Figure 1:
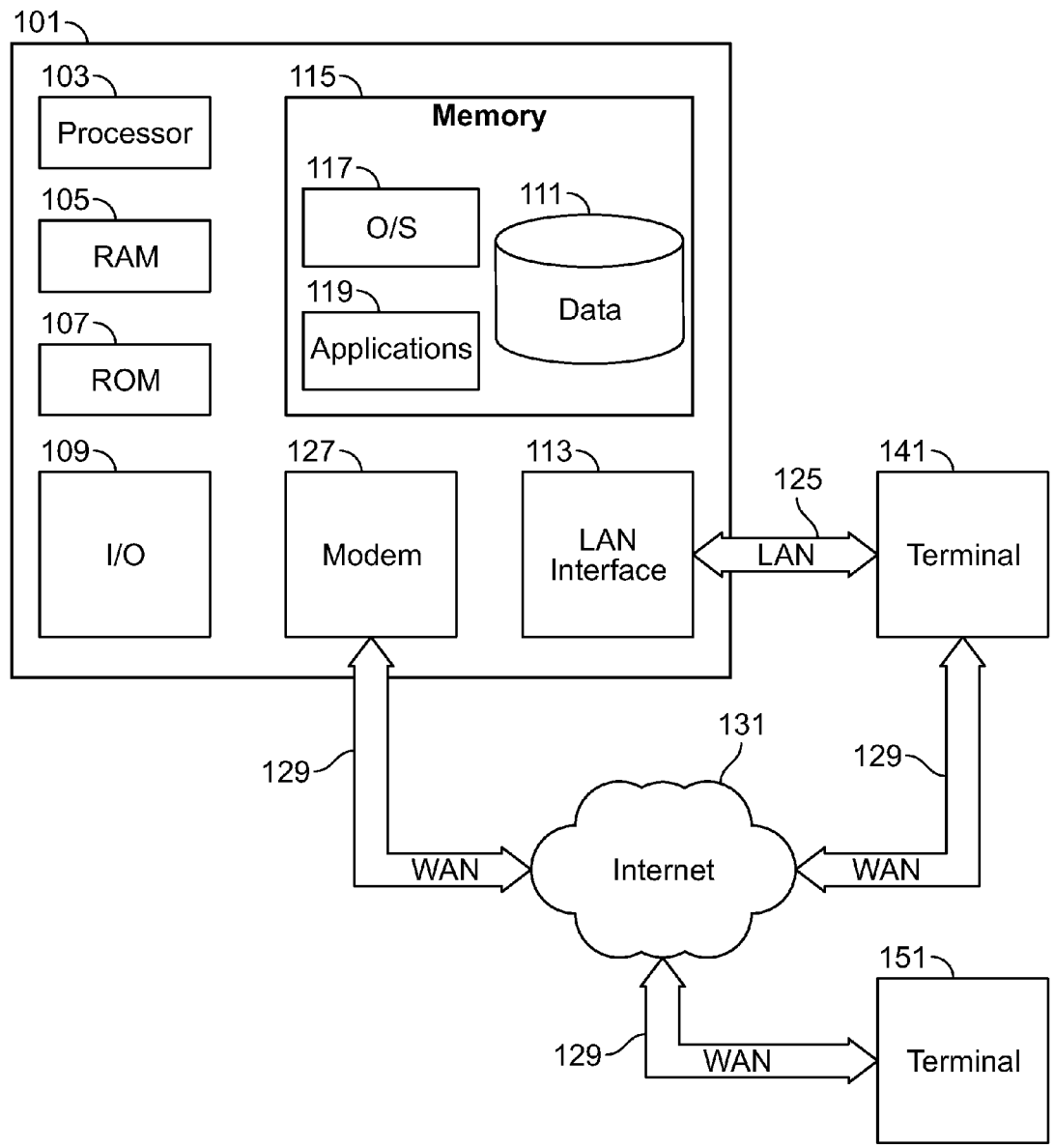
FIG. 1 shows illustrative apparatus in accordance with the principles of the invention.

The apparatus and methods of the invention relate to dynamically routing data. The invention may include a plurality of document capture channels. Each document capture channel may capture data from one or more sources, and upload the captured data to a database. Upon completion of the data upload, the document capture channel may publish a message including a message topic to a queue manager. The queue manager may transmit the message to an index router. The index router may have a subscription to the message topic included in the message. The message may inform the index router of the data upload. Upon receipt of the message, the index router may select a vendor to receive the data by applying one or more routing rules stored in a routing rules database.

The plurality of document capture channels may receive data by fax, scan jobs, e-mail, manual website upload and/or scanned regular mail. The data may be transmitted to the document capture channel from a data source such as a fax number, a website portal, or a scan job name. For the purposes of the application, a document capture channel may be any application that receives data.

In some embodiments, one or more of the document capture channels may upload received data to a database. In some embodiments, one or more modules, referred to alternately hereinafter as 'discovery modules,' may receive data captured by one or more document capture channels and subsequently upload the data to a database. In some embodiments, one or more document channels and one or more discovery modules may be used to upload data to a database. References hereinafter relating to a document capture channel may be understood to apply to a discovery module as well.

The uploaded data may be batch data, a plurality of data files or a single data file. Exemplary data that may be uploaded includes documents, stock prices, electronic images, excel spreadsheets, or any other suitable electronic data.

A document capture channel or a discovery module may upload data to the database once a day, multiple times a day, or during any other suitable time period. The uploaded data may be referred to alternately herein as 'batch data,' however this is for exemplary purposes only and is not limiting in any way.

The database may be a self-contained storage device that includes the storage and software needed to receive, store and transmit data. In some embodiments, the database may be a cloud storage device. Exemplary cloud storage devices that may be used include the EMC Atmos® storage system, the NetApp® Cloud and IBM® Cloud Storage Software.

The database may store the uploaded data in one or more folders. The folders may be referred to alternately herein as pre-routing folders. The pre-routing folder(s) may include a header, or document path. The document path may specify how the data was received by the document capture channel, the year, month and date that the data was uploaded to the database, and any other suitable data.

The document capture channel or the discovery module may transmit, or 'publish,' a message to a server. The document capture channel or the discovery module may publish the message once the data upload is complete, or substantially complete.

The server may be a queue manager. The queue manager may be part of message queuing software. Exemplary message queuing software that may be used to implement the systems and methods of the invention includes the IBM® Websphere® MQ messaging system, the Oracle® Advanced Queuing system and the Java® Message Service.

In some embodiments, document capture channels and/or discovery modules used to upload data to the database may include an application such as an MQ client provided by the IBM® Websphere® MQ messaging system. The application may be in electronic communication with the queue manager and may have access to a portion of the database for data uploading purposes.

The message may be an XML message. The message may include a subscription description, also known as a 'message topic.' For example, a message topic used by the invention may be 'CaptureNewBatch.'

The message may also include a file locater. The file locater may specify where the uploaded files have been stored in the database. In some embodiments, the file locater may include the document path of the files in the database.

The message may further include batch attribute data. Batch attribute data may identify one or more characteristics of the uploaded data. For example, the message may include batch attribute data such as a document capture channel that captured the data, a division or 'line or business' associated with the data and/or the data source. Batch data with specific batch attributes may be referred to alternately herein as a 'defined batch type.'

Examples of document capture channels, divisions and data sources are included in Table 1 below.

TABLE 1

Illustrative Batch Attribute Data

| Batch Attribute Data | Examples |
| --- | --- |
| Document Capture Channel | Fax |
| | Scan |
| | Manual File Upload |
| | Manual Website Upload |
| | E-mail |
| | Scanned Postal Mail |
| Division/Line of Business | Mortgages |
| | Tax |
| | Post Closing |
| | Sales |
| | Fulfillment |
| | Servicing |
| | Default |
| Data Source | Fax Number |
| | Portal Name |
| | Scan job name |

The queue manager may receive the publication from the document capture channel or the discovery module. Upon receipt of the publication, the queue manager may query a queue database for one or more subscribers. Specifically, the queue manager may query the queue database for subscriber(s) with a subscription to the message topic include in the message. For the purposes of the application, a subscriber may be an application with one or more subscriptions registered with the queue manager.

After identifying the subscriber(s) that subscribed to the message's message topic, the queue manager may transmit the message to the identified subscribers. In some embodiments, the index router may be the only subscriber to the message's message topic. In other embodiments, the index router may be one of two or more subscribers to the message's message topic. For the purposes of the application, an index router may be an application configured to route data uploaded in the database to a vendor. The vendor may be selected based on one or more business routing rules.

The index router may have one or more subscriptions registered with the queue manager. The index router may have a subscription to the message topic included in the message transmitted by the document capture channel or the discovery module.

In some embodiments, the document capture channels and/or the discovery modules may use the same message topic to transmit multiple messages to the index router. In some embodiments, two or more document capture channels and/or discovery modules may use two or more different message topics to communicate with the index router. In these embodiments, the index router may have a subscription to all of the message topics used by the document capture channels and/or the discovery modules to communicate with the index router. Exemplary message topics that may be used include Capture/NewBatch/Scan, Capture/NewBatch/Fax and/or Capture/NewBatch/File Upload.

It should be noted that, in some embodiments, the queue manager and the index router may run in the same server. In other embodiments, the queue manager may run in a server different from the server running the index router.

The index router may receive the message transmitted from the queue manager. Upon receipt of the message, the index router may process the message. After processing the message, the index router may select a recipient to receive the batch data. For the purposes of the application, a recipient will be referred to alternately herein as a 'vendor,' however any recipient may receive stored data. The index router may select the vendor by identifying or receiving a routing rule stored in a routing rules database.

The index router may select a vendor based on business defined routing rules (referred to alternately herein as 'routing rules'). The routing rules may be stored in a routing rule database ('RRD'). The RRD may store a plurality of routing rules in a rules engine.

The routing rules may be based at least in part on batch attribute data. Exemplary batch attributes include a document capture channel, a division, and/or a data source. The batch attribute data may be included in the message transmitted by the document capture channel to the index router. Accordingly, in some embodiments, the index router may execute batch data routing, based at least in part on the batch data's attributes, without having to access the batch data stored in the database.

The routing rules may define one or more vendors selected to receive a defined batch type. A routing rule may define a vendor by identifying one or more of a message topic, a destination address and/or a vendor identifier associated with the vendor. The message topic may be a message topic subscribed to by the vendor. The destination address may be a post-routing database location or any other suitable location. The destination address may be an area in the database accessible to the vendor. A destination address may be internal or external to the business supporting the apparatus and methods of the invention.

The routing rules may also include vendor split percentage logic. Vendor split percentage logic may be applied when two or more vendors have been selected to receive a defined batch type. The vendor split percentage logic may relate to what percentage of batches of the defined batch type should to be sent to each of the selected vendors. Percentages may be split from 0 to 100 in increments of 1%, 5%, 10%, or any other suitable integer or non-integer value.

For example, a routing rule may state that documents captured by document capture channel 'FAX' and associated with the LOB 'PostClosing' are transmitted to either Vendor1 or Vendor2. The vendor split percentage logic may state that 30% of this defined batch type should be transmitted to Vendor 1, and 70% should be transmitted to Vendor2.

The index router may locate a routing rule by caching, or searching, routing rules stored in the RRD. In some embodiments, the index router may search for a routing rule associated with the batch attributes included in the received message. In some embodiments, the index router may transmit batch attribute data to the RRD. The batch attribute data may be included in the message transmitted to the index router. The RRD may then identify a routing rule based on the batch attribute data and transmit the routing rule to the index router. Exemplary batch attribute data includes one or more of a document capture channel, LOB and/or data source.

After identifying or receiving the routing rule, the index router may communicate with a tracking database. The tracking database may be included in the application running the index router. Alternatively, the tracking database may be included in an application different from the index router. The tracking database may include routing rules, temporary counters, and/or other information needed for the router to work.

The tracking database may support the implementation of the vendor split percentage logic included in the routing rule identified by the index router. In some embodiments, the tracking database may implement the vendor split percentage logic by maintaining a temporary counter for each defined batch type in the RRD. A temporary counter may maintain a historical record of recent data routing for a defined batch type. Based on the historical data and the vendor split percentage logic, the tracking database may identify which vendor should receive a current batch of a defined batch type.

In some embodiments, the tracking database may use round robin logic to apply vendor split percentage logic. In the embodiments in which the vendor split percentage logic is applied in increments of 10%, the tracking database may establish routing logic for ten batches of data. The temporary counter may then be reset after every ten batches.

For example, a routing rule in accordance with the invention may require that batches received from channel A with fax number xxx-xxx-xxxx be routed 30% to vendor 1 and 70% to vendor 2. As a result, the tracking database may send the first 3 batches of the defined batch type to vendor 1 and the next 7 batches to vendor 2. After the tenth batch has been routed, the tracking database may reset the internal counter and subsequently apply the same logic to the next set of 10 batches of data from channel A with fax number xxx-xxx-xxxx.

It should be noted that, in some embodiments, the routing rules may be applied to each workload on a per batch level.

In these embodiments, the vendor split percentage logic may be applied on a per-batch level irrespective of the quantity of data contained in each batch.

The routing rules stored in the RRD may be default rules or rules input or selected by a user in a user interface. A user interface that enables a user to define routing rules stored in the RRD may be referred to alternately hereinafter as a 'RUI'. The RUI may enable users to add, delete, modify, and otherwise manage routing rules stored in the RRD.

The RUI may be in electronic communication with the RRD. Modification(s) made to routing rules displayed in the RUI, once saved, may be transmitted to the RRD substantially immediately or when effective date(s) of modified rules become current.

Changes to the routing rules included in the RUI may be effective substantially immediately after saved. In some embodiments, the RUI may include an option to delay the implementation of a routing rule modification until a user-selected date. Accordingly, the routing of millions of documents may be easily manipulated using a user interface. When desired, adjustments to the routing of millions of documents may be implemented substantially immediately.

The RUI may display a plurality of defined batch types. The RUI may define each defined batch type using one or more batch characteristics. For example, the RUI may specify batches by one or more of channel, division and data source.

The RUI may include input fields or selectable icons for selecting one or more vendors to receive a defined batch type. The RUI may additionally, or alternatively, include input fields or selectable icons for choosing a percentage. The percentage may specify a percentage of a defined batch type to be routed to a vendor. The split percentages may be provided in increments of 10 or using any other suitable increment.

In some embodiments, the RUI may include a default vendor split percentage rule for one or more defined batch types. For example, the RUI may include a default rule for batch types defined by both channel and division. The RUI may also include an overriding function. The overriding function, when selected, may further define a rule for a batch type and override a default rule.

For example, selection of a '+' icon may expand a batch type defined in the RUI by channel and division. The expanded batch type may display one or more data sources associated with the channel and division. The user may then define a new vendor split percentage rule based on a new defined batch type. The new defined batch type may include a channel, division and data source. The new vendor split percentage rule may override the default rule with respect to the new defined batch type.

For example, the RUI may include a routing rule for all data received by fax from the sales division. A user may want to modify the default rule for data received by fax from the sales division with fax number xxx-xxx-xxxx. The user may effect this change by expanding the default rule and inputting new vendor split data next to the desired fax number.

In some embodiments, the RRD may store a backlog processing priority for one or more defined batch types. In these embodiments, the index router may search the RRD for both a routing rule and a backlog processing priority associated with batch data characteristics defined in a received message.

A backlog processing priority ('priority') assigned to a defined batch type may relate to a relative priority of the defined batch type in relation to the other defined batch types stored in the RDD. The priority may be used by a vendor in the event that he is unable to meet his data processing SLAs and a backlog has accrued. The vendor may use the priority values assigned to his backlogged data as a guide to which data to process first. In some of these embodiments, the RUI may include input fields for a user to assign a priority level to one or more defined batch types.

After the index router has identified a routing rule and a routing priority, the index router may initiate the transfer of the batch data from the pre-routing folder to a destination address such as a post-routing folder. A vendor with access to the post-routing folder may be referred alternately herein as the 'selected vendor.' The priority decision identified by the index router may be referred to alternately herein as the 'selected priority.'

In some embodiments, the index router may actualize the data transfer by linking the pre-routing folder to the post-routing folder. The post-routing folder may be stored in the database in an area accessible to the selected vendor. In some embodiments, the area of the database storing the post-routing folder may be located on the other side of one or more firewalls with respect to the area of the database storing the pre-routing folder. In some of these embodiments, the area of the database storing the post-routing folder may be accessible only to the selected vendor.

In some embodiments, the index router may actualize the data transfer to the destination address by transferring file content within the database, which may be a cloud storage device. The data transfer may also include transferring metadata such as batch attribute data. The metadata may be transmitted to the destination address and/or the metadata may be included in a message sent to the selected vendor using message queuing software.

Upon completion of the data transfer, the index router may publish a message to the queue manager. In some embodiments, the message may include a priority assigned to the batch data. The message may also include a message topic. The message topic may be subscribed to by the selected vendor and, in some embodiments, one or more other subscribers. In some embodiments, the selected vendor may be the only vendor subscribed to the message topic. An exemplary message topic may be Indexing/Newbatch/Vendor1. In some embodiments, the message may also include batch characteristic data and/or other data included in the message transmitted by the document capture channel or the discovery module to the index router.

The index router and/or the tracking database may store a plurality of message topics and/or post-routing folders. Each of the message topics and/or post-routing folders may be associated with one or more vendor identifiers. In some embodiments the routing rule may include a single vendor identifier. Receipt of the single vendor identifier by the index router may initiate the index router to identify a message topic and a post-routing folder associated with the vendor identifier. The index router may then upload batch data to the retrieved post-routing folder and publish a message to the queue manager with the retrieved message topic.

In the embodiments wherein the routing rule includes two or more vendor identifiers, the index router may transmit the vendor identifiers to the tracking database. The tracking database may determine which vendor identifier should be used for data transmission based on historical data. After identifying the vendor identifier to be used, the index router may identify a message topic and a post-routing folder associated with the vendor identifier. The index router may then upload batch data to the retrieved post-routing folder and publish a message to the queue manager with the retrieved message topic.

In some embodiments, if a single vendor is defined in the RRD to receive a defined batch type, the routing rule associated with the defined batch type may include a message topic and a post routing folder. In some embodiments, the routing rule may also include a vendor identifier. After receipt of the routing rule, the index router may upload batch data to the post-routing folder defined by the routing rule and publish a message to the queue manager with the message topic defined by the routing rule.

In some of these embodiments, if two or more vendors are defined in the RRD to receive a defined batch type, the routing rule associated with the defined batch type may include two or more vendor identifiers associated with the two or more vendors and vendor split percentage logic. Each vendor identifier may be associated with one of the two or more vendors. After receipt of the routing rule, the index router may transmit the vendor identifiers to the tracking database to apply the vendor split percentage logic to the two or more vendor identifiers. The tracking database may determine which vendor identifier should be used for data transmission based on historical data. After identifying the vendor identifier to be used, the index router may identify a message topic and a post-routing folder associated with the vendor identifier. The index router may then upload batch data to the retrieved post-routing folder and publish a message to the queue manager with the retrieved message topic.

In other embodiments, if two or more vendors are defined in the RRD to receive a defined batch type, the routing rule associated with the defined batch type may include two or more vendor identifiers associated with the two or more vendors and vendor split percentage logic. The routing rule may also include a message topic and a post-routing folder associated with each vendor identifier. After receipt of the routing rule, the index router may transmit the vendor identifiers to the tracking database to apply the vendor split percentage logic to the two or more vendor identifiers. The tracking database may determine which vendor identifier should be used for data transmission based on historical data. After identifying the vendor identifier to be used, the index router may identify the message topic and the post-routing folder associated with the vendor identifier in the transmitted message. The index router may then upload batch data to the identified post-routing folder and publish a message to the queue manager with the identified message topic.

In some embodiments, vendors identified in the RUI for receiving batch data may have access to an application such as an MQ client provided by the IBM® Websphere® MQ messaging system. The application may be in electronic communication with the queue manager and a portion of the database. Each of the vendors may have at least one subscription with the queue manager. At least one of the subscriptions may be used by the index router to inform the vendor of data ready to be processed.

Thus, apparatus and methods have been provided for enabling a business to receive and transmit documents using one or more routing rules. Exemplary advantages of the invention include enabling a business to maximize vendor competitive advantage by using the RUI to substantially immediately re-route data to a cheaper and/or more skilled vendor. Additional exemplary advantages include providing contingency in case of vendor failure by using the RUI to substantially immediately terminate data transfer to a failing vendor and to reroute the workload to an alternate destination.

The invention has been described herein using messaging technology to initiate data transmission from document capture channels and/or discovery modules to the index router, and from the index router to vendors. In these embodiments, the queue manager may be responsible for pushing data to the index router and to the vendors. This provides the advantage of reducing network overhead by eliminating the need for the index router and the vendors to continually scan for data.

However, it should be noted that other communication means may be used between two or more of the document capture channels, the discovery modules, the index router and/or the vendors. For example, the index router may pull batch data from the channels or discovery modules and when the data is ready for routing, the vendors may pull the data from the index router.

An index router in accordance with the invention may be used to route any form of data. For example, the invention may be used by a financial institution to route documents for indexing and classification purposes. The financial institution may receive millions of images daily. Some of these images may need to be processed manually for indexing and classification purposes. Documents requiring manual processing may be uploaded to the database from one or more document capture channels and/or discovery modules. The index router may route these documents to one or more service providers for indexing and classification. The routing may be based on business rules input in the RUI by financial institution personnel. Accordingly, the routing of millions of documents may be easily and substantially immediately controlled in accordance with the real time interests of the institution.

Illustrative embodiments of apparatus and methods in accordance with the principles of the invention will now be described with reference to the accompanying drawings, which form a part hereof. It is to be understood that other embodiments may be utilized and structural, functional and procedural modifications may be made without departing from the scope and spirit of the present invention.

As will be appreciated by one of skill in the art upon reading the following disclosure, the document capture channels, the discovery modules, the queue manager, the routing rules database, the RUI, the image index router and/or the tracking database may be embodied as a method, a data processing system, or a computer program product. Accordingly, the document capture channels, the discovery modules, the queue manager, the routing rules database, the RUI, the image index router and/or the tracking database may take the form of an entirely hardware embodiment, an entirely software embodiment or an embodiment combining software and hardware aspects.

Furthermore, the document capture channels, the discovery modules, the queue manager, the routing rules database, the RUI, the image index router and/or the tracking database may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

In an exemplary embodiment, the document capture channels, the discovery modules, the queue manager, the routing rules database, the RUI, the image index router and/or the tracking database may be embodied at least partially in hardware and include one or more databases, receivers, transmitters, processors, modules including hardware and/or any other suitable hardware. Furthermore, operations executed by the document capture channels, the discovery modules, the queue manager, the routing rules database, the RUI, the image index router and/or the tracking database may be performed by the one or more databases, receivers, transmitters, processors and/or modules including hardware.

FIG. 1 is a block diagram that illustrates a generic computing device 101 (alternately referred to herein as a "server") that may be used according to an illustrative embodiment of the invention. The computer server 101 may have a processor 103 for controlling overall operation of the server and its associated components, including RAM 105, ROM 107, input/output module 109, and memory 115.

Input/output ("I/O") module 109 may include a microphone, keypad, touch screen, and/or stylus through which a user of server 101 may provide input, and may also include one or more of a speaker for providing audio output and a video display device for providing textual, audiovisual and/or graphical output. Software may be stored within memory 115 and/or storage to provide instructions to processor 103 for enabling server 101 to perform various functions. For example, memory 115 may store software used by server 101, such as an operating system 117, application programs 119, and an associated database 111. Alternately, some or all of server 101 computer executable instructions may be embodied in hardware or firmware (not shown). As described in detail below, database 111 may provide storage for information input into one or more of the database(s) described herein, the document capture channels, the discovery modules, the queue manager, the routing rules database, the RUI, the image index router and/or the tracking database.

Server 101 may operate in a networked environment supporting connections to one or more remote computers, such as terminals 141 and 151. Terminals 141 and 151 may be personal computers or servers that include many or all of the elements described above relative to server 101. The network connections depicted in FIG. 1 include a local area network (LAN) 125 and a wide area network (WAN) 129, but may also include other networks. When used in a LAN networking environment, computer 101 is connected to LAN 125 through a network interface or adapter 113. When used in a WAN networking environment, server 101 may include a modem 127 or other means for establishing communications over WAN 129, such as Internet 131. It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages via the World Wide Web from a web-based server. Any of various conventional web browsers can be used to display and manipulate data on web pages.

Additionally, application program 119, which may be used by server 101, may include computer executable instructions for invoking user functionality related to communication, such as email, short message service (SMS), and voice input and speech recognition applications.

Computing device 101 and/or terminals 141 or 151 may also be mobile terminals including various other components, such as a battery, speaker, and antennas (not shown).

A terminal such as 141 or 151 may be used by a user of the merchant RUI to access and input information into the RUI. Information input into the RUI may be stored in memory 115. The input information may be processed by an application such as one of applications 119.

Figure 2:
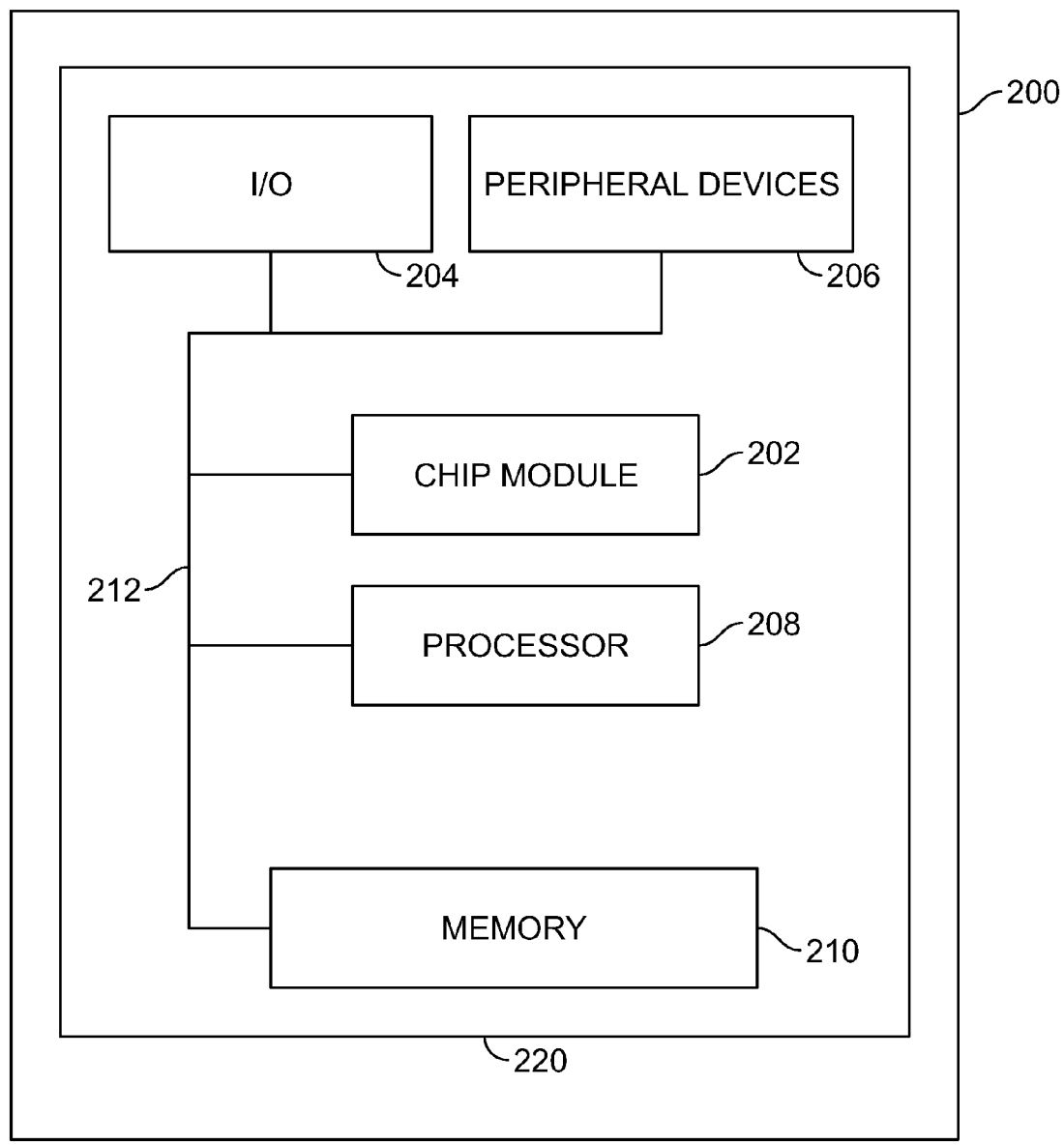
FIG. 2 shows another illustrative apparatus in accordance with the principles of the invention.

FIG. 2 shows an illustrative apparatus that may be configured in accordance with the principles of the invention.

FIG. 2 shows illustrative apparatus 200. Apparatus 200 may be a computing machine. Apparatus 200 may be included in apparatus shown in FIG. 1. Apparatus 200 may include chip module 202, which may include one or more integrated circuits, and which may include logic configured to perform any other suitable logical operations.

Apparatus 200 may include one or more of the following components: I/O circuitry 204, which may include the transmitter device and the receiver device and may interface with fiber optic cable, coaxial cable, telephone lines, wireless devices, PHY layer hardware, a keypad/display control device or any other suitable encoded media or devices; peripheral devices 206, which may include counter timers, real-time timers, power-on reset generators or any other suitable peripheral devices; logical processing device ("processor") 208, which may compute data structural information, structural parameters of the data, quantify indicies; and machine-readable memory 210.

Machine-readable memory 210 may be configured to store in machine-readable data structures: data lineage information; data lineage, technical data elements; data elements; business elements; identifiers; associations; relationships; and any other suitable information or data structures.

Components 202, 204, 206, 208 and 210 may be coupled together by a system bus or other interconnections 212 and may be present on one or more circuit boards such as 220. In some embodiments, the components may be integrated into a single silicon-based chip.

It will be appreciated that software components including programs and data may, if desired, be implemented in ROM (read only memory) form, including CD-ROMs, EPROMs and EEPROMs, or may be stored in any other suitable computer-readable medium such as but not limited to discs of various kinds, cards of various kinds and RAMs. Components described herein as software may, alternatively and/or additionally, be implemented wholly or partly in hardware, if desired, using conventional techniques.

Various signals representing information described herein may be transferred between a source and a destination in the form of electromagnetic waves traveling through signal-conducting encoded media such as metal wires, optical fibers, and/or wireless transmission encoded media (e.g., air and/or space).

Apparatus 200 may operate in a networked environment supporting connections to one or more remote computers via a local area network (LAN), a wide area network (WAN), or other suitable networks. When used in a LAN networking environment, apparatus 200 may be connected to the LAN through a network interface or adapter in I/O circuitry 204. When used in a WAN networking environment, apparatus 200 may include a modem or other means for establishing communications over the WAN. It will be appreciated that the network connections shown are illustrative and other means of establishing a communications link between the computers may be used. The existence of any of various well-known protocols such as TCP/IP, Ethernet, FTP, HTTP and the like is presumed, and the system may be operated in a client-server configuration to permit a user to operate processor 208, for example over the Internet.

Apparatus 200 may be included in numerous general purpose or special purpose computing system environments or configurations. Examples of well-known computing systems, environments, and/or configurations that may be suitable for use with the invention include, but are not limited to, personal computers, server computers, hand-held or laptop devices, mobile phones and/or other personal digital assistants ("PDAs"), multiprocessor systems, microprocessor-based systems, tablets, programmable consumer electronics, network PCs, minicomputers, mainframe computers, distributed computing environments that include any of the above systems or devices, and the like.

Figure 3:
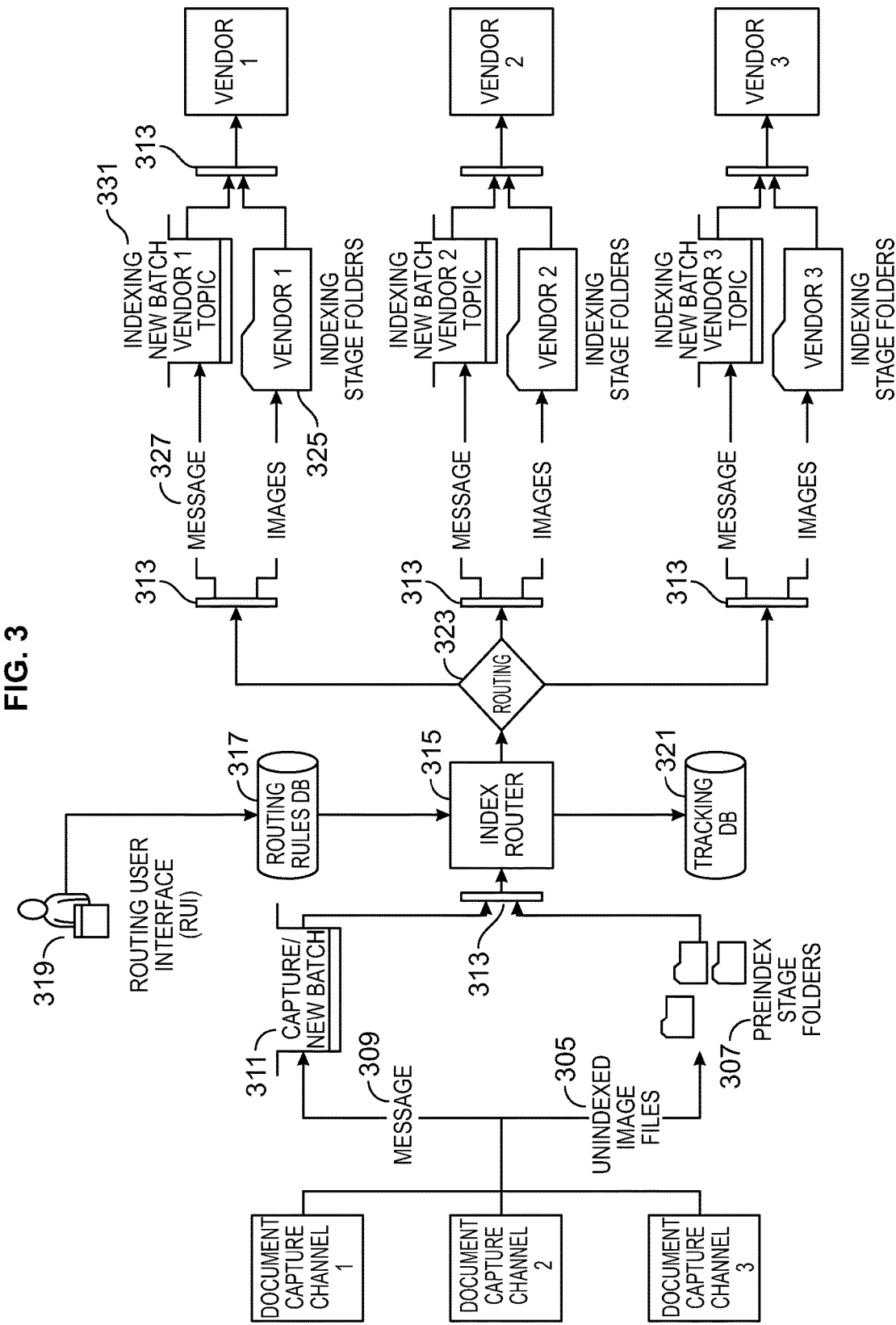
FIG. 3 shows an illustrative process and apparatus in accordance with the principles of the invention.
Figure 4:
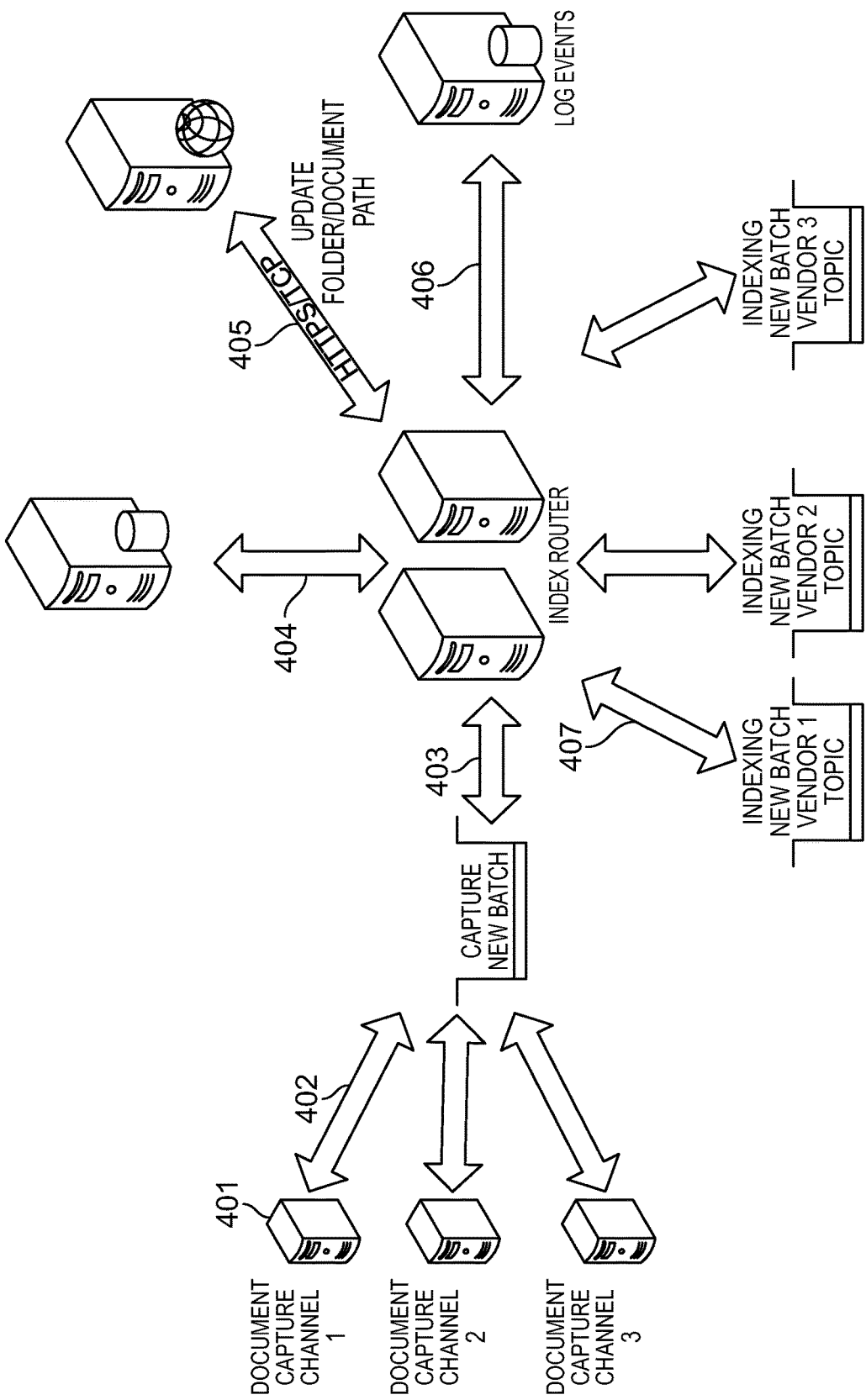
FIG. 4 shows another illustrative process and apparatus in accordance with the principles of the invention.
Figure 5:
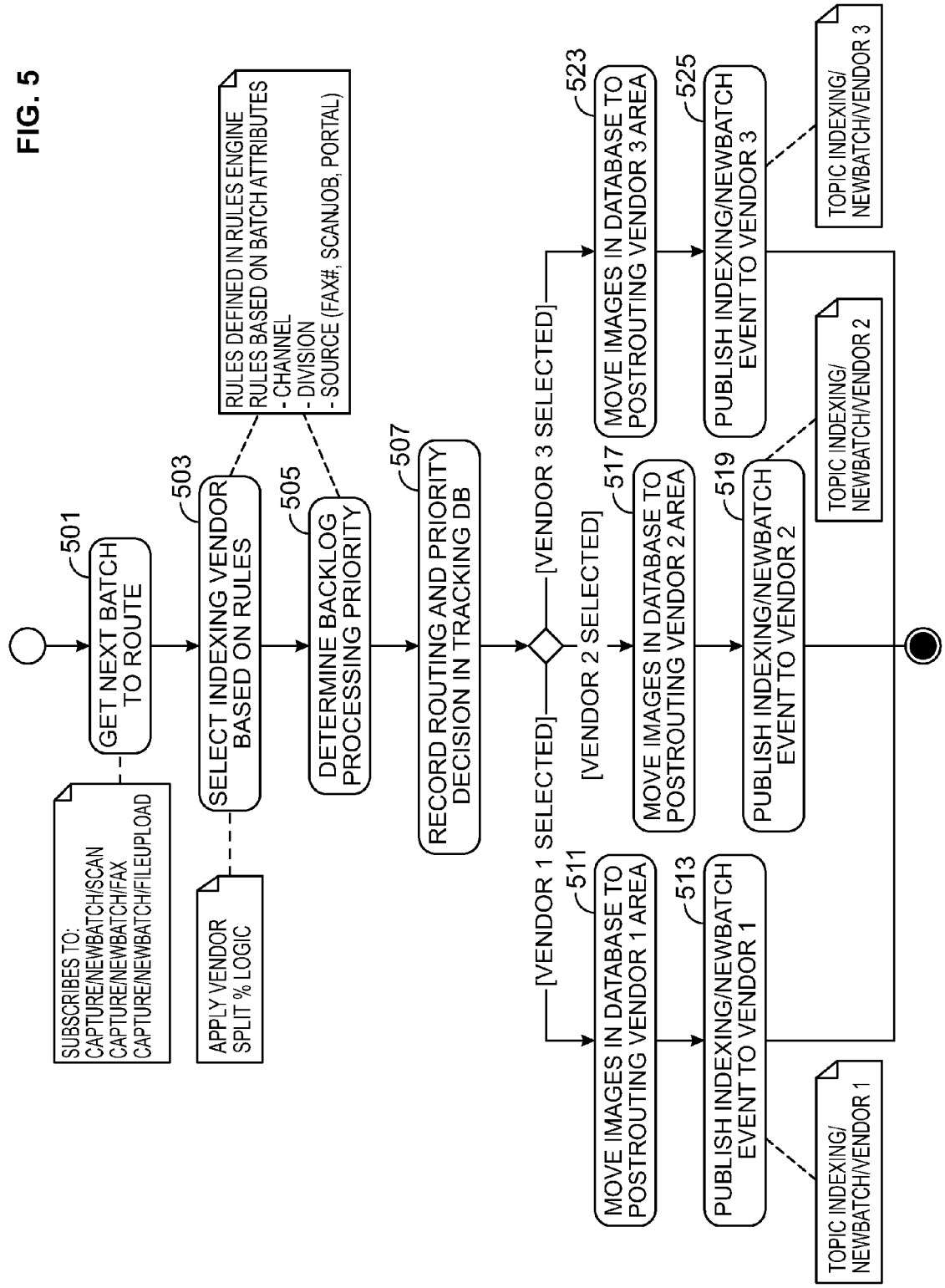
FIG. 5 shows illustrative steps of a process in accordance with the principles of the invention.

FIGS. 3-4 illustrate exemplary processes and apparatus that may be used in accordance with the systems and methods of the invention. FIG. 5 illustrates an exemplary process that may be used in accordance with the systems and methods of the invention. It should be noted that the exemplary processes and apparatus illustrated in FIGS. 3-5 are for illustrative purposes only. Each of the steps and apparatus included in FIGS. 3-5 are optional, and may be deleted, modified, and/or generated in an order different from the order illustrated. Furthermore, one or more steps and/or apparatus not illustrated in FIGS. 3-5, but described herein, may be added to the processes and apparatus detailed in FIGS. 3-5.

Additionally, it should be noted that each of the steps illustrated in FIGS. 3-5 may be executed by one or more receivers, transmitters, processors, and/or any other suitable hardware or software.

FIG. 3 shows an illustrative process and apparatus in accordance with the invention. The illustrative process included in FIG. 3 may include one or more steps 305-331. FIG. 3 may represent a process in which data is transmitted from document capture channels to an index router and subsequently to a vendor for indexing purposes.

FIG. 3 may include document capture channel 1, document capture channel 2 and document capture channel 3. At least one of the document capture channels may receive data that needs to be transmitted to vendor 1, vendor 2 or vendor 3. To transmit data to a vendor, a document capture channel may transmit unindexed image files 305 to preindex stage folders 307. Preindex stage folders 307 may be stored in a database.

After successful upload of unindexed image files 305 to preindex stage folders 307, the document capture channel may publish message 309 with queue manger 313. Message 309 may include message topic Caputre/NewBatch 311. Message topic Capture/NewBatch 311 may be a message topic subscribed to by index router 315. It should be noted that in other embodiments, a discovery module may perform one or more of the steps performed by the document capture channel in FIG. 3.

Queue manager 313 may transmit message 309 to index router 315. Message 309 may include batch attribute data. Index router 315 may transmit at least a portion of the batch attribute data to routing rules database ('DB') 317. Routing rules DB 317 may store a plurality of routing rules. Each of the routing rules may be associated with a defined batch type. Routing rules stored in routing rules DB 317 may be configured by a user via routing user interface ('RUI') 319.

Routing rules DB 317 may transmit a routing rule to index router 315. The routing rule transmitted to index router 315 may be selected by the routing rule DB 317 based at least in part on the batch attribute data included in message 309.

Upon receipt of the routing rule, index router 315 may communicate with tracking DB 321. Index router 315 may communicate with tracking DB 321 to apply vendor split percentage logic included in the routing rule received from routing rules DB 317. In some embodiments, index router 315 may communicate with tracking DB 321 only if the routing rule included vendor split percentage logic. Tracking DB 321 may select a vendor to receive unindexed image files 305 based on the routing rule and stored historical data. In FIG. 3, the vendor selected to receive unindexed image files 305 may be vendor 1.

After selection of vendor 1, the index router may proceed with routing 323. Routing 323 may include transmitting unindexed image files 305 to indexing stage folders 325. Indexing stage folders 325 may be stored in a database. The database may be part of the database that stored unindexed image files 305 in preindex stage folders 307. In some embodiments, the area of the database that stored stored unindexed image files 305 in preindex stage folders 307 may be separated from indexing stage folders 325 by one or more firewalls.

After the successful upload of unindexed image files 305 to indexing stage folders 325, index router 315 may publish message 327 with queue manager 313. Message 327 may include message topic Indexing/NewBatch/Vendor1 331. In some embodiments, message 327 may also include a priority level assigned to the transmitted data. The message topic may be a message topic subscribed to by vendor 1. Accordingly, queue manager 313 may transmit message 327 to vendor 1.

Vendor 1 may receive message 327 from queue manager 313. Receipt of message 327 from queue manager 313 may notify vendor 1 of the unindexed image files 305 that have been uploaded to indexing stage folders 325. Vendor 1 may support one or more applications with access to indexing stage folders 325. Thus, vendor 1 may now commence processing of the unindexed images files 305 stored in indexing stage folders 325.

FIG. 4 shows an illustrative process and apparatus in accordance with the invention. The illustrative process included in FIG. 4 may include one or more of steps 401-407.

In step 401, document capture channel 1 may receive data to be transmitted to an index router. In step 402, document capture channel 1 may upload the received data to a database. In step 403, document capture channel 1 may publish a message with a message topic 'CaptureNewBatch' to a queue manager. It should be noted that in other embodiments, a discovery module may perform one or more of the steps performed by document capture channel 1 in FIG. 4.

In step 404, an index router may receive the message and search a rules database for a routing rule. In FIG. 4, index router may identify vendor 1 as the vendor to receive the uploaded data based at least in part on one or more routing rules stored in the rules database. In step 405, the index router may update the folder/document path of the uploaded data. The index router may update the folder/document path in order to move the data to an area of the database accessible by vendor 1.

At step 406, the index router may log selected vendor 1 with a log events database. In some embodiments, the log events database may be included in a tracking database. An internal counter stored in the tracking database may use the logged data to apply vendor split percentage logic.

At step 407, the index router may publish a message with the queue manager. The message may include the message topic 'Indexing/NewBatch/Vendor1.' The message topic may be a message topic subscribed to by vendor 1.

The queue manager may transmit the message to vendor 1. Receipt of the message by vendor 1 may notify vendor 1 of the uploaded data ready for processing.

FIG. 5 shows an illustrative process in accordance with the invention. The illustrative process in FIG. 5 may include one or more of steps 501-525.

At step 501, an index router may receive a message from a queue manager. The message may alert the index router of a batch of data ready to be routed. The index router may receive the message by subscribing to a message topic included in the received message. Exemplary message topics that the index router may subscribe to in order to be notified about data ready for routing include CAPTURE/NEWBATCH/SCAN, CAPTURE/NEWBATCH/FAX and CAPTURE/NEWBATCH/FILEUPLOAD.

At step 503, the index router may select a vendor to route the batch of data based on one or more routing rules. The index router may select the vendor by accessing rules defined in a rules engine. The index router may also select the vendor by applying vendor split percentage logic.

The rules in the rules engine may be based on batch attributes. Exemplary batch attributes include channel, division and/or source. Examples of a source are a fax number, a scan job identifier and a website portal identifier that received the documents from a user.

At step 505, the index router may determine a backlog processing priority. The backlog processing priority may be a priority value associated with the batch of data. The priority value may be stored in the rules engine.

At step 507, the index router may record the routing and priority decisions made with respect to the uploaded data in a tracking database. In the event that vendor 1 was selected to receive the uploaded data, the index router may move images in the database to a postrouting vendor 1 area at step 511. Postrouting vendor 1 area may be an area of the database accessible to vendor 1.

At step 513, the index router may publish a message with a queue manager. The published message may include an indexing/newbatch message topic. Vendor 1 may be subscribed to the indexing/newbatch message topic. An exemplary message topic is 'INDEXING/NEWBATCH/VENDOR1.' Accordingly, the queue manager may transmit the message to vendor 1. Receipt of the message may alert vendor 1 of the uploaded data ready to be processed.

In the event that vendor 2 was selected to receive the uploaded data, the index router may move images in the database to a postrouting vendor 2 area at step 517. Postrouting vendor 2 area may be an area of the database accessible to vendor 2.

At step 519, the index router may publish a message with a queue manager. The published message may include an indexing/newbatch message topic. Vendor 1 may be subscribed to the indexing/newbatch message topic. An exemplary message topic is 'INDEXING/NEWBATCH/VENDOR2.' Accordingly, the queue manager may transmit the message to vendor 2. Receipt of the message may alert vendor 2 of the uploaded data ready to be processed.

In the event that vendor 3 was selected to receive the uploaded data, the index router may move images in the database to a postrouting vendor 3 area at step 523. Postrouting vendor 3 area may be an area of the database accessible to vendor 3.

At step 525, the index router may publish a message with a queue manager. The published message may include an indexing/newbatch message topic. Vendor 3 may be subscribed to the indexing/newbatch message topic. An exemplary message topic is 'INDEXING/NEWBATCH/VENDOR3.' Accordingly, the queue manager may transmit the message to vendor 3. Receipt of the message may alert vendor 3 of the uploaded data ready to be processed.

FIG. 6 shows illustrative RUI 601 in accordance with the invention. Illustrative RUI 601 may enable a user to easily manipulate routing rules. RUI 601 may be in electronic communication with an RRD and/or a tracking database in accordance with the invention. Thus, routing rules input and saved in RUI 601 may be stored in the RRD and/or the tracking database and subsequently used by the index router to route documents to a plurality of vendors.

RUI 601 may include a plurality of data fields. Exemplary data fields include channel 603, division 605, source 607 and description 609. Data input into columns associated with channel 603, division 605, source 607 and description 609 may be batch attribute data. Data displayed in a row associated with columns channel 603, division 605, source 607 and description 609 may set forth the batch attributes of a defined batch type. RUI 601 may define routing rules for batches with the batch attributes defined by channel 603, division 605, source 607 and description 609. It should be noted that the batch attribute data identified in RUI 601 is exemplary only, and any suitable data may be used to define a batch type.

RUI 601 may also include vendor split percentage logic input fields. Vendor split percentage logic input fields may include data fields vendor1 split % 611, vendor2 split % 613 and total split % 615. Data input into the vendor split percentage logic input fields may be used by RUI 601 to generate the routing rules and/or vendor split percentage logic stored in the RRD. It should be noted that an RUI in accordance with the invention may include vendor split percentage logic input fields for any suitable number of vendors, such as three vendors, five vendors or ten vendors.

RUI 601 may additionally include effective from 617. Effective from 617 may display a date on which data input into vendor split percentage logic data input fields was implemented by the index router.

It should be noted that input of a percentage greater than zero in a vendor split percentage logic input field may cause a vendor to receive the input percentage of data routed by the index router.

RUI 601 may also include indexing priority 619. Indexing priority 619 may include input fields which can be used by a user to associate a processing priority to a defined batch type. In RUI 601, indexing priority may be ranked from 1 (highest priority) to 5 (lowest priority). RUI 601 may additionally include effective from 621. Effective from 621 may display a date on which an indexing priority was implemented by the index router.

RUI 601 may further include is active 623. Is active 623 may include a plurality of graphical indicators. Each graphical indicator may set forth whether or not a defined batch type is active. An active defined batch type may be a batch type that is currently being routed based on routing rules stored in RUI 601.

RUI 601 may also include submit (save) 625 and cancel 627. Submit (save) 625, when selected, may put into effect any changes made to the routing rules in RUI 601. Thus, saving data in RUI 601 may result in substantially immediately altering the routing rules used by the index router to route uploaded data. However, if an effective from date and/or time was specified in the RUI which is later in time then a time at which submit (save) 625 was selected, the routing rules will only be altered when the effect from date and/or time becomes current.

Cancel 627, when selected, may remove any changes made to RUI 601 relative to the most recent saved version of RUI 601.

Thus, methods and apparatus for routing data based on one or more routing rules have been provided. Persons skilled in the art will appreciate that the present invention can be practiced in embodiments other than the described embodiments, which are presented for purposes of illustration rather than of limitation, and that the present invention is limited only by the claims that follow.

What is claimed is:

1. One or more non-transitory computer-readable media storing computer-executable instructions which, when executed by a processor on a computer system, perform a method for routing data to a vendor, the method comprising:
   using a receiver to receive a first message from a queue manager, wherein the first message includes:
      a first message topic corresponding to a first subscription description;
      a pre-routing database location where batch data is stored; and
      batch data characteristics, wherein the batch data characteristics include an identification of a document capture channel that captured the batch data and a line of business associated with the batch data;
      wherein the receiver has registered a subscription with the queue manager for the first message topic;
   in response to the first message, using a processor to identify a routing rule stored in a rules database, the routing rule being associated with the batch data characteristics in the rules database, the routing rule comprising:
      a post-routing database location; and
      a second message topic defined by the routing rule corresponding to a second subscription description, wherein a vendor has registered a subscription with the queue manager for the second message topic;
   using the processor to transfer the batch data from the pre-routing database location to the post-routing database location, wherein the post-routing database location is accessible to a vendor;
   upon completion of the data transfer, using a transmitter to transmit a second message to the queue manager, the second message including the second message topic, wherein the vendor has registered a subscription with the queue manager for the second message topic;
   receiving at a user interface, the interface in electronic communication with the rules database:
      a first input modifying a routing rule; and
      a second input selecting a time for the modified routing rule to become effective.

2. The media of claim 1 wherein, in the method, the document capture channel is a fax machine, a scanning machine or a document upload portal.

3. The media of claim 1 wherein the method further comprises using the processor to transmit at least a portion of the routing rule to a tracking database, wherein the tracking database is configured to implement a vendor split percentage logic included in the routing rule, the vendor split percentage logic including logic for sequentially distributing the transmission of each of a plurality of batches of data with the batch data characteristics among a plurality of post-routing database locations.

4. The media of claim 3 wherein, in the method, the post-routing database location is a first post-routing database location and the routing rule further comprises:
a second post-routing database location; and
vendor split percentage logic including logic for distributing the transmission of batches of data with the batch data characteristics between the first database location and the second database location;
wherein, the tracking database is configured to maintain an internal counter to determine, based on recent routing data, which database location receives each of the plurality of batches of data with the batch data characteristics.

5. The media of claim 4 wherein, in the method, the routing percentage logic is applied to the transmission of ten batches of batch data with the batch data characteristics.

6. The media of claim 5 wherein, in the method, the tracking database includes an internal counter that is reset after the tenth batch is transmitted.

7. The media of claim 1 wherein, in the method, the pre-routing database location and the post-routing database location are separated by one or more firewalls.

8. The media of claim 1 wherein, in the method, the routing rules stored in the rules database are configurable using a user interface.

9. The media of claim 8 wherein, in the method, the user interface includes a plurality of input fields.

10. The media of claim 8 wherein, in the method, the routing rule is identified by the processor without accessing the batch data stored in the pre-routing database location.

11. Apparatus for routing batch data to two or more vendors, the apparatus comprising:
a receiver configured to receive a first message from a queue manager, the first message comprising:
a first message topic corresponding to a first subscription description;
a pre-routing database location where batch data is stored; and
batch data characteristics, the batch data characteristics defining characteristics of the stored batch data, wherein the batch data characteristics include an identification of a document capture channel that captured the batch data and a line of business associated with the batch data;
wherein the receiver has registered a subscription with the queue manager for the first message topic;
a transmitter configured to transmit to a rules database the batch data characteristics;
in response to the transmission of the batch data characteristics, the receiver being further configured to receive a routing rule from the rules database, the routing rule comprising a vendor identifier;
a processor configured to identify a post-rotating database location associated with the vendor identifier and a second message topic associated with the vendor identifier;
the processor being further configured to transfer the batch data from the pre-routing database location to the post-routing database location; and
upon completion of the data transfer, the transmitter being further configured to transmit a second message to the queue manager, the second message including the second message topic, wherein a vendor has registered a subscription with the queue manager for the second message topic
a user interface in electronic communication with the rules database, the user interface configured to receive a user input modifying a routing rule, wherein the modified routing rule becomes effective at a time specified by the user.

12. The apparatus of claim 11 wherein the first message topic is a message topic subscribed to by an index router, the index router incorporating the receiver, the transmitter, and the processor.

13. The apparatus of claim 11 wherein the document capture channel is a fax channel, a scan channel or a document upload channel.

14. The apparatus of claim 11 wherein the vendor identifier is a first vendor identifier and the routing rule further comprises:
a second vendor identifier; and
vendor split percentage logic including logic for selecting the first vendor identifier or the second vendor identifier for receiving batches of data with the batch data characteristics.

15. The apparatus of claim 14 wherein the routing logic is applied to the transmission of ten batches of batch data with the batch data characteristics.

16. The apparatus of claim 11 wherein the pre-routing database location and the post-routing database location are separated by one or more firewalls.

17. The apparatus of claim 11 wherein the rules database stores a plurality of routing rules.

18. The apparatus of claim 17 wherein each of the plurality of the routing rules are associated with a predetermined batch type, the predetermined batch type being defined by one or more batch data characteristics.

19. The apparatus of claim 18 wherein the routing rules stored in the rules database are configurable using a user interface.

20. The apparatus of claim 19 wherein the user interface includes a plurality of input fields.

* * * * *